United States Patent [19]

Hisano

[11] Patent Number: 5,479,568
[45] Date of Patent: Dec. 26, 1995

[54] REASONING COMPUTER SYSTEM

[75] Inventor: Atsushi Hisano, Nagaokakyo, Japan

[73] Assignee: Omron Corporation, Kyoto, Japan

[21] Appl. No.: 300,486

[22] Filed: Sep. 2, 1994

Related U.S. Application Data

[62] Division of Ser. No. 51,262, Apr. 22, 1993, Pat. No. 5,363,472, which is a continuation of Ser. No. 838,507, Feb. 18, 1992, abandoned, which is a continuation of Ser. No. 414,026, Sep. 28, 1989, abandoned.

[30] Foreign Application Priority Data

Sep. 30, 1988 [JP] Japan ................................. 63-248662
Sep. 30, 1988 [JP] Japan ................................. 63-248663

[51] Int. Cl.⁶ ......................................................... G06F 9/44
[52] U.S. Cl. ................................ 395/3; 395/51; 395/900
[58] Field of Search ................................. 395/3, 900, 51, 395/61

[56] References Cited

U.S. PATENT DOCUMENTS 3,700,866  10/1972  Taylor ................................. 235/150.1
4,837,725  6/1989   Yamakawa ........................... 364/807
4,875,184  10/1989  Yamakawa ........................... 364/807
4,910,684  3/1990   Ostergaard et al. .................. 364/503
5,012,430  4/1991   Sakurai .................................. 364/513

OTHER PUBLICATIONS

"High–Performance Computer Architecture," Harold S. Stone, Addison–Wesley Publishing Company.

Primary Examiner—Robert W. Downs
Attorney, Agent, or Firm—Dickstein, Shapiro & Morin

[57] ABSTRACT

A fuzzy reasoning computer comprising an input controller, fuzzy rule storage, fuzzy rule register, rule controller and a fuzzy reasoning unit. The fuzzy reasoning computer further comprises rule selection components for selecting a fuzzy rule, address generating components for converting fuzzy rule data into addresses, and accessing components responsive to said addresses for accessing at least one of input data and output data and membership functions. The accessing components include the function of accessing input data from a second reasoning computer.

11 Claims, 19 Drawing Sheets a : OUTPUT OF COUNTER 1
b : OUTPUT OF COUNTER 2
$\ell$ : OUTPUT OF ACCUMULATOR 1
r : OUTPUT OF ACCUMULATOR 2 if x2=A and y2=B then x1=C if x1=A then Z1=C if Z1=D then Z2=E

REASONING COMPUTER SYSTEM

This application is a divisional of application Ser. No. 08/051,262 filed Apr. 22, 1993, now U.S. Pat. No. 5,363,476, which is a continuation of application Ser. No. 07/838,507, filed Feb. 18, 1992, now abandoned, which is a continuation of application Ser. No. 07/414,026, filed Sep. 28, 1989, now abandoned.

BACKGROUND OF THE INVENTION

1. Field of the Invention

This invention relates to a reasoning computer system, and more particularly to an improved reasoning computer system having a simplified construction and versatile applications.

2. Discussion of the Related Art

There is well known a fuzzy computer which produces a predetermined conclusion based on a predetermined fuzzy rule having an antecedent and a consequent and an input sinal aplied thereto. Accordingly, the conventional computer has the disadvantages that it is restricted by the predetermined fuzzy rule, a limited lattitude of reasoning, and lack of universality.

SUMMARY OF THE INVENTION

It is, therefore, a primary object of this invention to provide a reasoning or inference computer system having an increased flexibility of reasoning and a broadened scope of uses.

It is a further object of this invention to provide a reasoning computer system having a plurality of reasoning computers with a multi-stage construction so that a reasoning operation by a primary computer can be shared with its child computer.

It is another object of this invention to provide a reasoning computer system having a simplified fuzzy computer construction.

According to this invention, there is provided a reasoning or inference computer system in a multi-stage construction including a primary reasoning computer at a rank having a reasoning system for producing a reasoned result, at least one child reasoning computers at a lower rank having a reasoning system for producing a reasoning result, and a system for providing the reasoning results by the child reasoning computers to the reasoning systems of the primary reasoning computer, whereby the reasoning by the primary reasoning computer is assisted by the child reasoning computers.

According to another aspect of this invention there is provided a fuzzy reasoning computer system including a systems for providing a membership function with pulse widths representing membership values corresponding to fuzzy variables.

Other objects and advantages of this invention will become apparent from the following detailed description and accompanying drawings, in which:

DETAILED DESCRIPTION OF THE INVENTION

Figure 1:
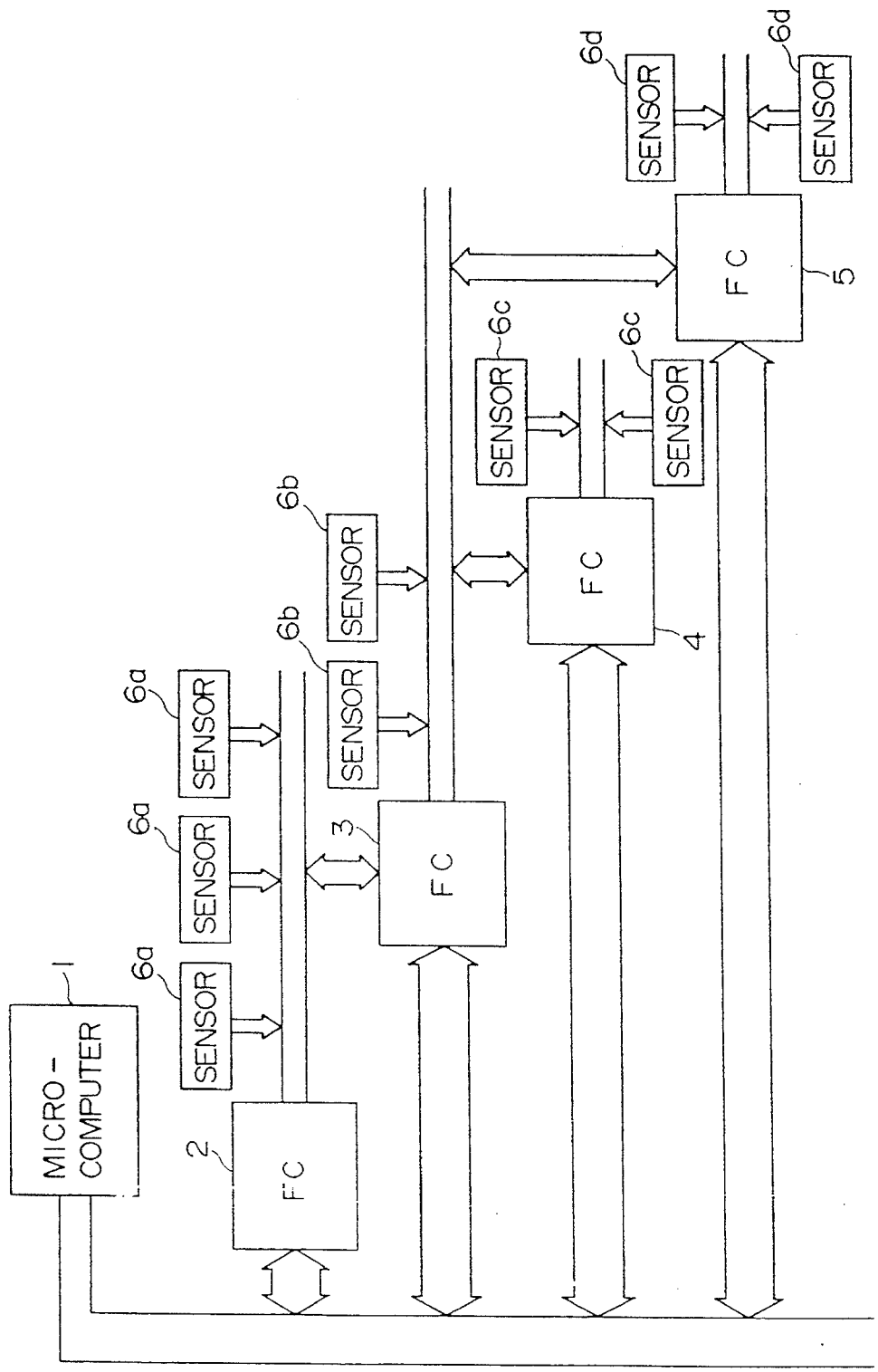
FIG. 1 shows a construction of a preferred embodiment of a system for executing a multi stage fuzzy reasoning according to this invention.

Referring now to FIG. 1, there is shown an example of a schematic construction of a system as a preferred embodiment of this invention. In the system, there are arranged fuzzy computers (briefly "FC") 2, 3, 4 and 5 under a higher rank computer 1 including of micro-miniaturized digital computer, so called micro-computer. This system is constructed in a multistage fashion, with the first fuzzy computer 2 being associated with the second fuzzy computer 3, for instance.

The FC 2 is designed to receive the reasoning or inference results from the lower rank computer FC 3 as an input thereof to be reasoned or inferred in addition to the reasoning based on output from a plurality of sensors 6a.

Figure 2:
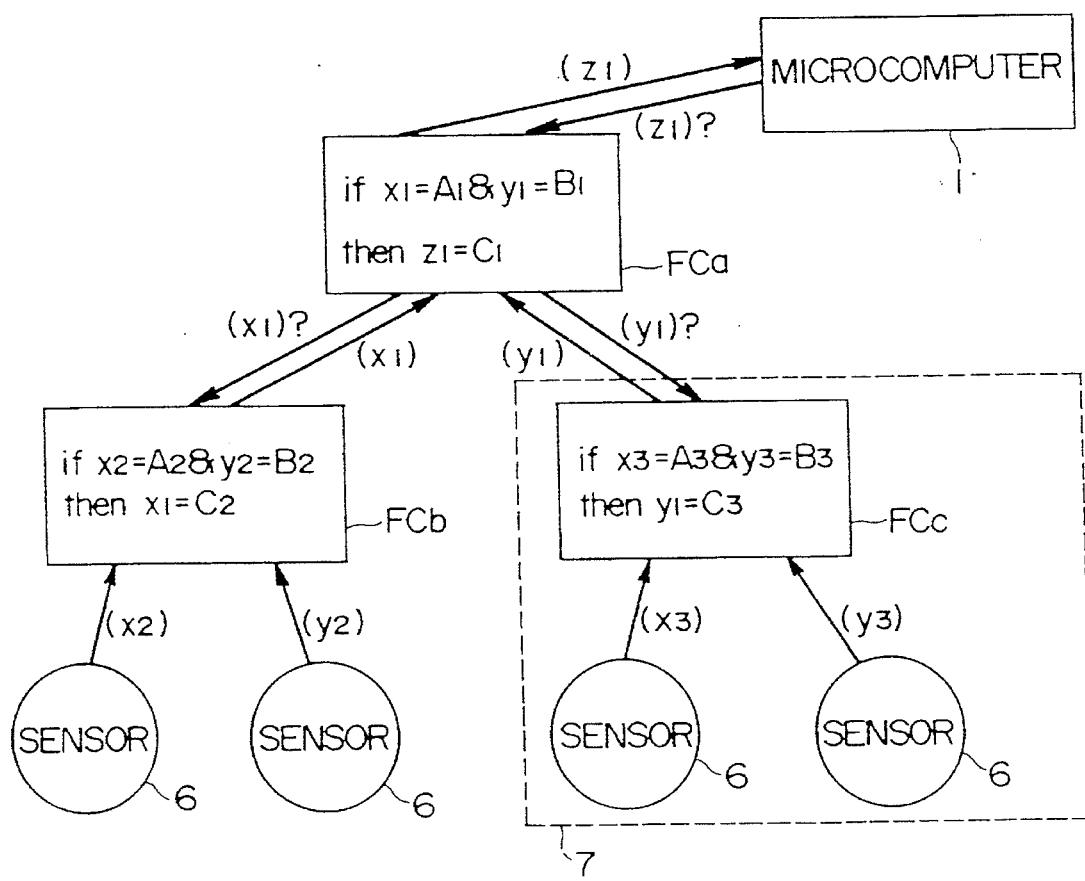
FIG. 2 is a schematic construction illustrating an example of a reasoning process in the system of FIG. 1.

The reasoning or inference executed by the system in this embodiment will be briefly described in conjunction with a schematic process shown in FIG. 2 for assisting in a full understanding of the disclosure. Assuming that the higher rank computer 1 instructs a reasoning execution about a proposition to the highest rank FCa, this instruction makes the request for a defuzzified output so that the FCa may activate the lower computer FCb or FCc if FCb or FCc can provide sufficient data for reasoning in accordance with the proposition. Upon this activation, the FCb or FCc executes the reasoning based on outputs applied from the respective sensors 6 and applies its results to the FCa which executes the reasoning for application to the higher rank computer 1 about its results. Thus executed final reasoning results are displayed by a display included in the higher rank computer 1 or applied to other system associated therewith as control signals.

Such a construction, in which a reasoning result produced by a lower rank FC is received by a higher rank FC like outputs from sensors, is advantageous in analyzing or reasoning about a large and complicated proposition.

In a section shown by a dotted line in FIG. 2, a lower rank FCc executes a reasoning according to outputs from sensors 6 and 6 associated thereto to apply a reasoning result to the higher rank FCa in a signal shape equal to the signal shape produced from the sensors 6 and 6, so that the higher rank FCa cannot discriminate whether the signal applied thereto is directly given by the sensors or the reasoning result by the FCc though such discrimination is not necessary in this embodiment. Accordingly, the section 7 shown by the dotted line plays the role of a sort of sensor, or a fuzzy sensor.

Figure 3:
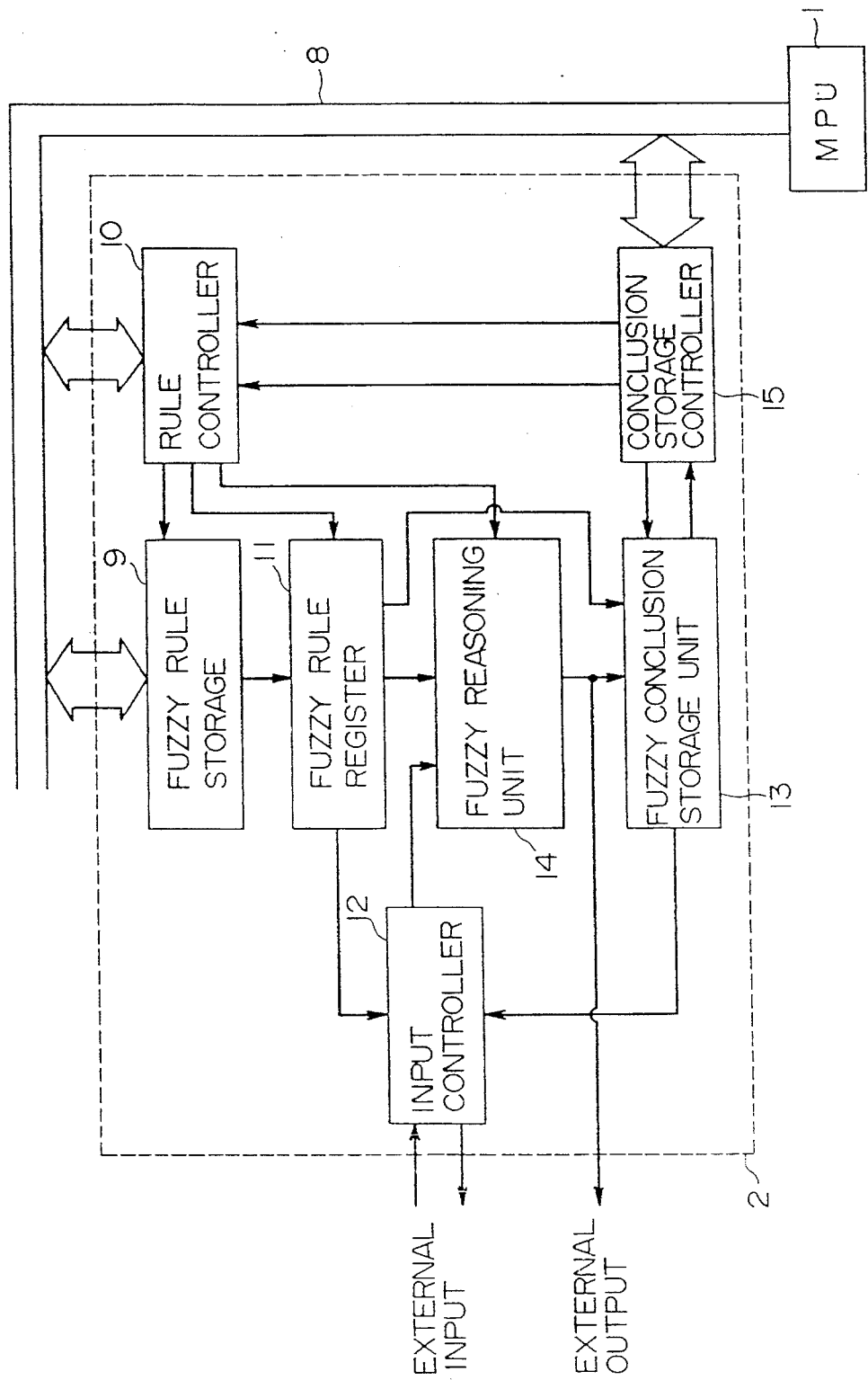
FIG. 3 is a schematic block diagram of a fuzzy computer employed in the system of FIG. 1.

Referring to FIG. 3, the relation between the fuzzy computer and the higher rank computer (hereinafter "MPU") 1 will be explained. The FC 2 exemplarily shown in FIG. 3 is connected with the MPU 1 through a higher rank bus 8. The MPU 1 stores fuzzy production rules into a fuzzy rule storage 9 through the bus 8 beforehand.

When a proposition is to be executed, the MPU 1 transfers data representing the proposition to a rule controller 10 through bus 8. As a result, the rule controller 10 selects from storage 9 a rule to be activated, and the selected rule is set to a fuzzy rule register 11.

The rule set in the fuzzy rule register 11 is examined as to whether a fuzzy variable should be read by an input controller 12 from an external input or from a fuzzy conclusion storage unit 13 set out later. The fuzzy variable selected by the examination is applied to a fuzzy reasoning unit 14 together with the rule from the register 11 to execute a reasoning. The result of the reasoning is applied to the fuzzy conclusion storage unit 13 and transferred to MPU 1 through a conclusion storage controller 15 and the higher rank bus 8.

The MPU 1 can freely access the fuzzy rule storage 9, the rule controller 10 and the conclusion storage controller 15 to execute and complete a desired reasoning.

The more detailed construction and operations of the fuzzy computer 2 of FIG. 3 will be set out below.

First, the reasoning operations in this system will be described referring to FIG. 2. The MPU 1 informs the FCa that it has to execute a reasoning about Z1. That is, MPU 1 makes a request for a defuzzified output thereto. This is assumed to be represented by such an "if-then" formula as a fuzzy production rule [if x1=A1·y1=B1 then Z1=C1], viz., "if x1 is A1 and y1 is B1, Z1=C1".

Upon the request, the FCa inquires where the fuzzy variable, x1 or y1, of the above fuzzy production rule at its antecedent is gained. Though the inquiry will be described later in detail, it is processed by the conventional fuzzy computer method if the fuzzy variable is obtained from the sensors 6 as an affirmed or decided value. If the variable is obtained from a result by another FC, however, all rules having at their consequents x1 or y1 are executed in a particular FC and the synthetic reasoning result gained from results by the execution is applied to FCa from FCb or FCc as an decided value.

The system in this embodiment is not limited by the two class construction consisting of FCa and FCb or FCc shown in FIG. 2, and has features such that if a FC located in a certain class executes a rule at its antecedent having a fuzzy variable not gained by any output from sensors, the FCs generating the above-mentioned fuzzy variable (viz., the lower rank) are sequentially activated.

Figure 4:
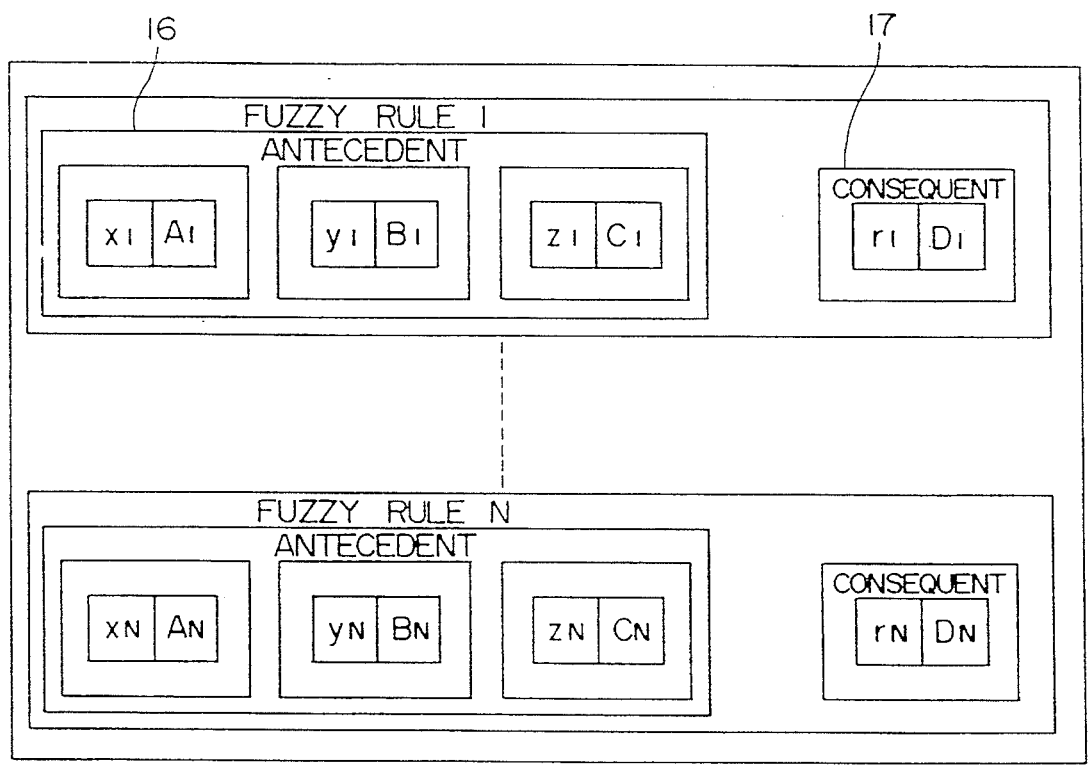
FIG. 4 illustrates a memory map of a fuzzy rule storage employed in the computer of FIG. 1.

The fuzzy rule storage 9 stores a plurality of fuzzy production rules in the "if-then" formula. As shown in FIG. 4, each rule has antecedent 16 and consequent 17. The fuzzy production rules (briefly called also "fuzzy rules") are written into the fuzzy rule storage 9 beforehand by MPU 1.

Figure 5:
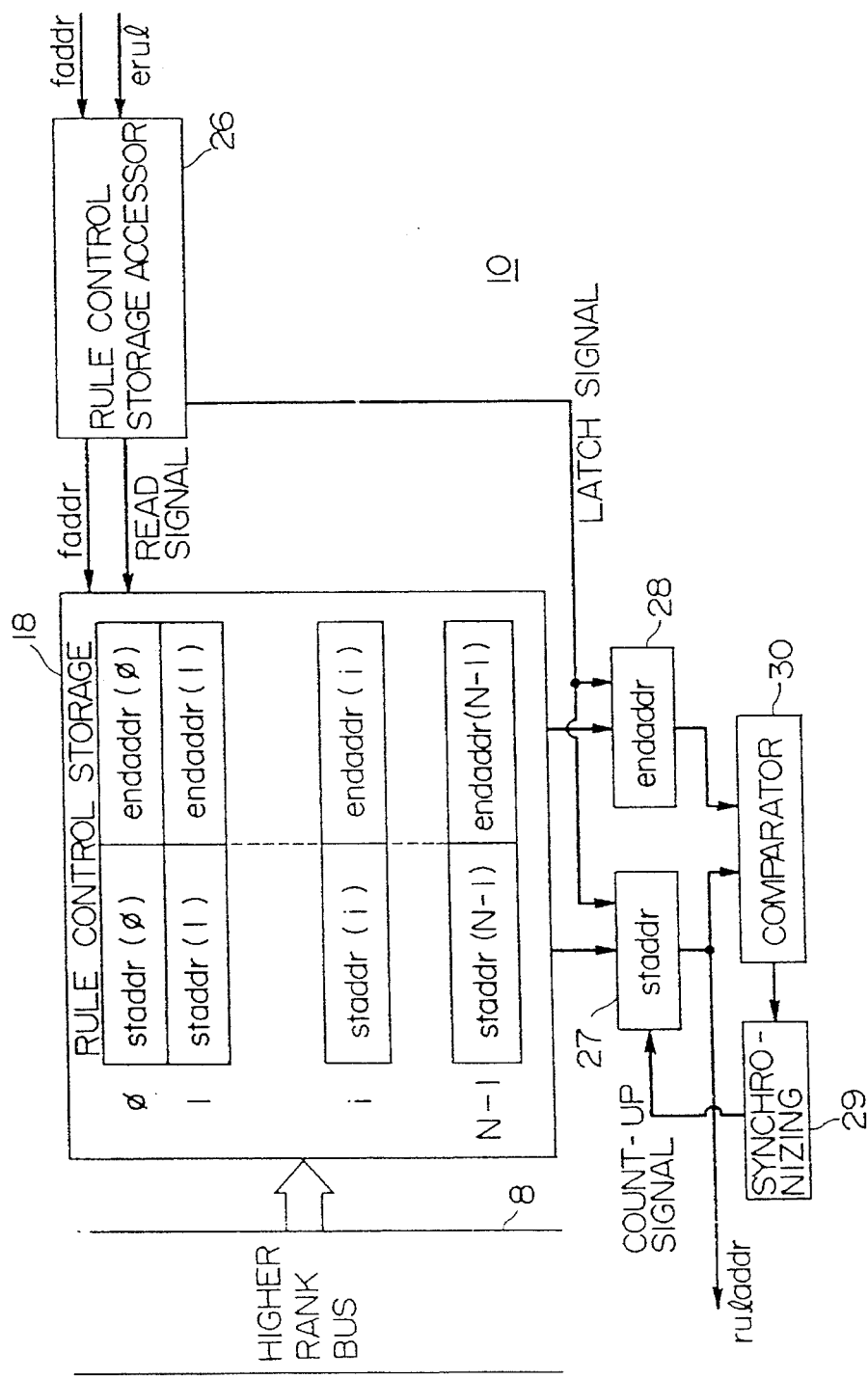
FIG. 5 is a schematic block diagram of a rule controller employed in the computer of FIG. 1.

As shown in FIG. 5, data deciding the fuzzy rule to be activated are written into the rule controller 10 in advance by MPU 1.

Figure 6:
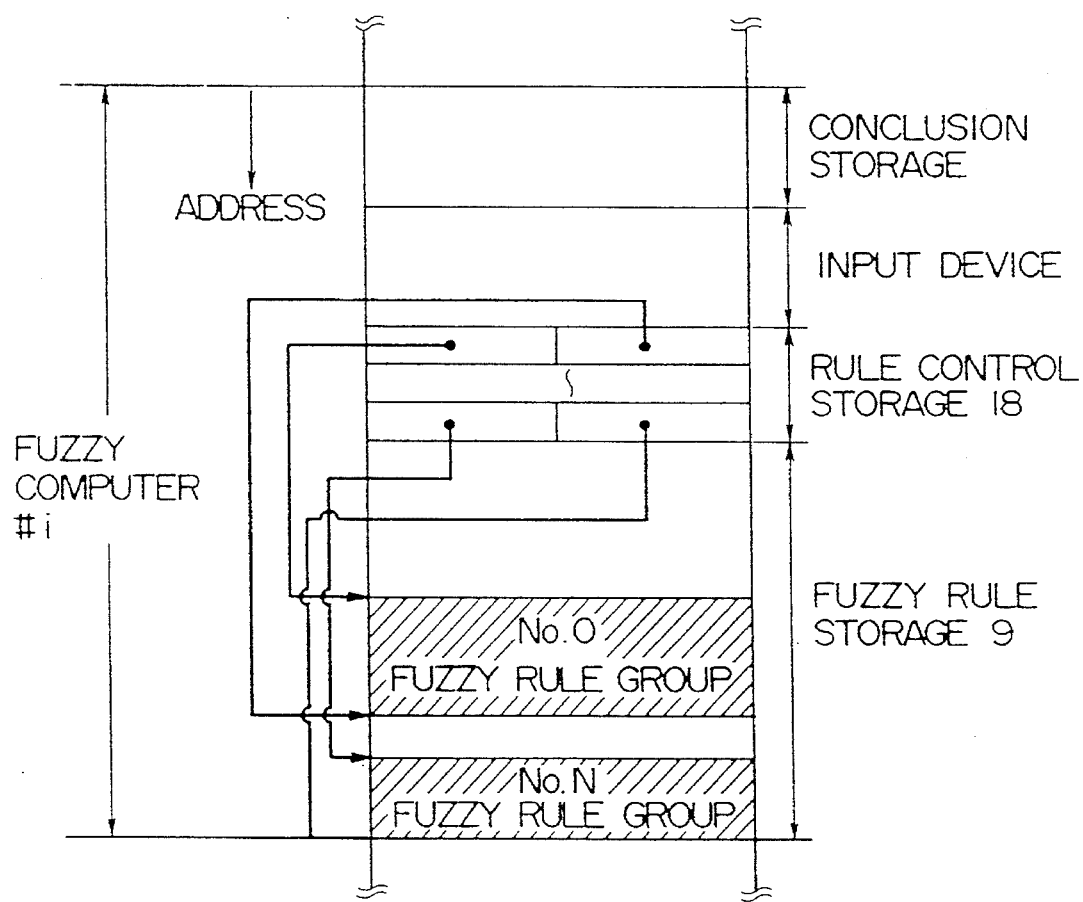
FIG. 6 illustrates a storage relationship between the fuzzy rule storage of FIG. 4 and a rule control storage employed in the rule controller of FIG. 5.

In FIG. 5, a start address "staddr (i)" and an end address "endaddr (i)" in a rule control memory 18 show the address of the fuzzy rule storage 9 where the rule at its antecedent having the same fuzzy variable is stored. FIG. 6 shows the storage relationship between fuzzy rule storage 9 and rule control storage 18.

Figure 7:
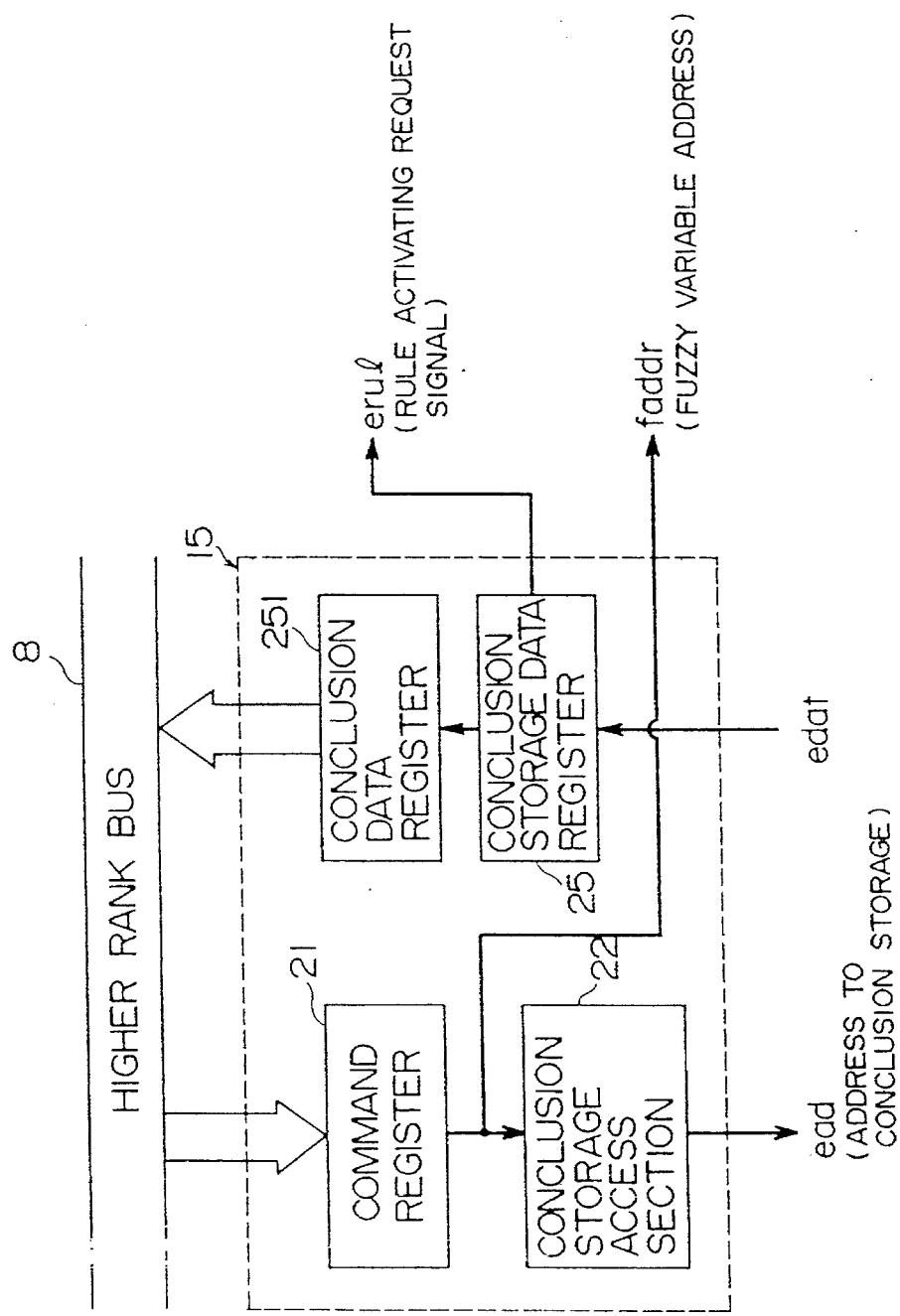
FIG. 7 is a block diagram of a conclusion storage controller employed in the computer of FIG. 3.
Figure 8:
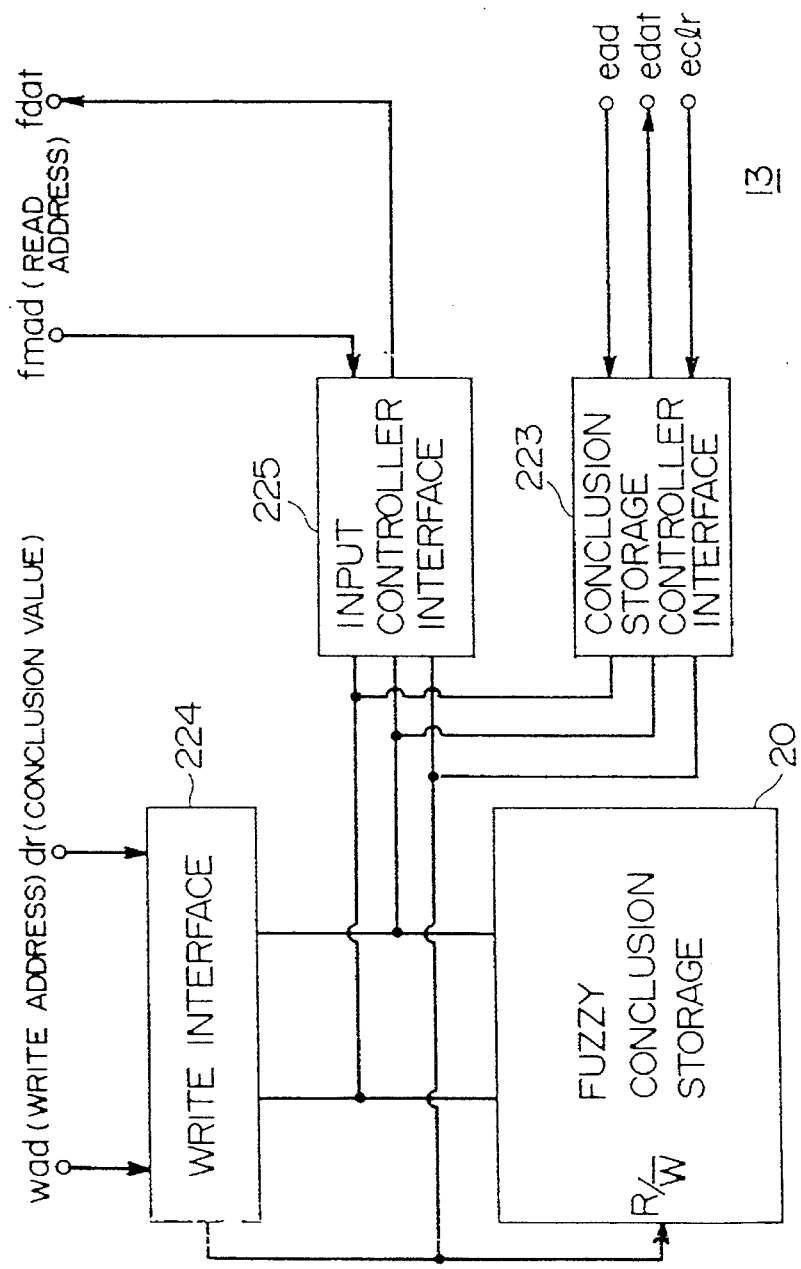
FIG. 8 is a block diagram of a fuzzy conclusion storage unit employed in the computer of FIG. 3.

Thus, MPU 1 writes fuzzy rules and rule control data into all FCs so that the system in this embodiment is initialized. Then, MPU 1 instructs disclosures of reasoning regarding predetermined items, while this instruction is applied to the conclusion storage controller 15 of FIG. 3 through the higher rank bus 8. The construction of the conclusion storage controller 15 is shown in FIG. 7. The fuzzy conclusion storage unit 13 is also shown in FIG. 8, and its fuzzy conclusion storage 20 is shown in FIG. 9.

If MPU 1 applies an address signal "i" to the conclusion storage controller 15 through the higher rank bus 8 in order to reason a phenomenon (item) "r", the address signal "i" is set to the command register 21 (FIG. 7) and a conclusion storage access section 22 produces an address signal "ead" for application to the fuzzy conclusion storage 20 (FIG. 8) to read a fuzzy variable value "edat" therefrom through a conclusion memory controller interface 223.

Figure 9:
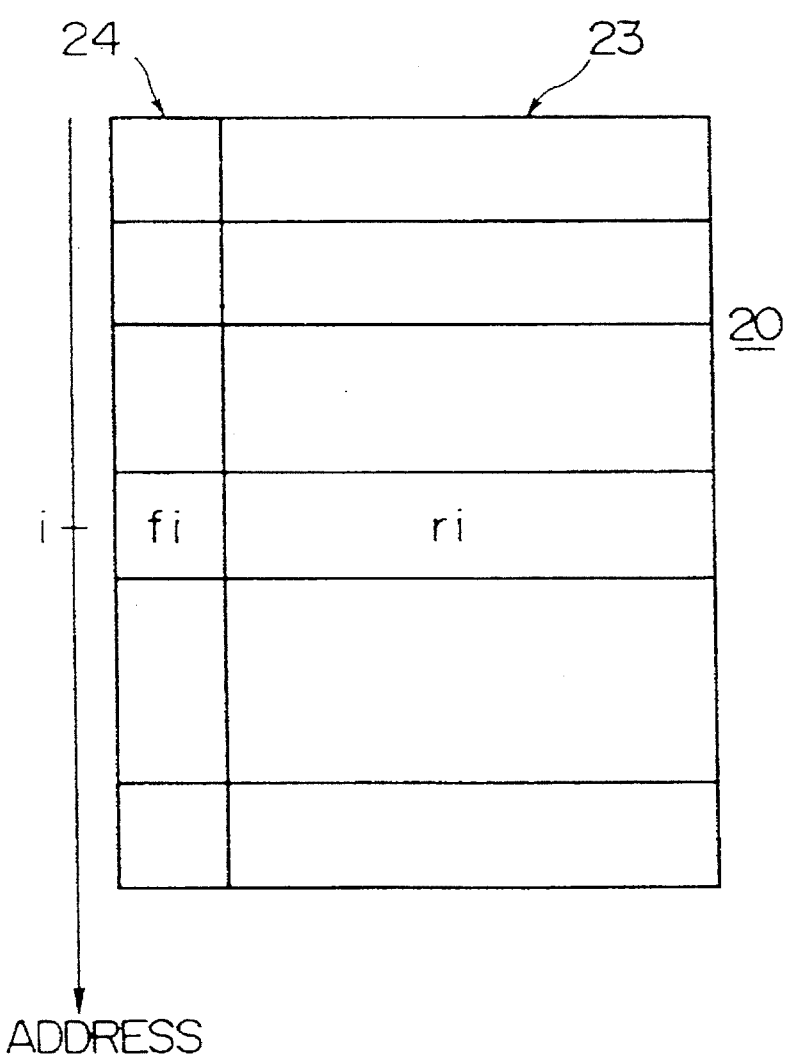
FIG. 9 illustrates a storage map of a fuzzy conclusion storage employed in the unit of FIG. 8.

As shown in FIG. 9, the fuzzy conclusion storage 20 stores reasoning results. Upon completion of reasoning in the fuzzy reasoning unit 14 of FIG. 3, the reasoning result representing a fuzzy variable value is set to a conclusion section 23 (ri: No. i fuzzy variable value) of the storage 20 and a flag "1" is set to a flag section 24 (fi: No. i fuzzy variable effective flag) at the highest digit thereof. Accordingly, when the flag is not set at the flag section 24, the corresponding fuzzy variable is regarded as invalid.

If the bit at the highest digit of the data "edat" read from the fuzzy conclusion storage 20 is "1", the data is regarded as valid to be set to a conclusion storage data register 25 of FIG. 7. If the bit of the read data "edat" at its highest digit is "0", a rule activating request signal "erul" is applied to a rule control storage accessor 26 of the rule controller 10 (FIG. 5) together with a fuzzy variable address "faddr" from the conclusion storage controller 15 (FIG. 7).

In the rule controller 10 of FIG. 5 a rule group (herein represented by "i") at its consequent having the fuzzy variable address "faddr" is found by reading the rule control storage 18, so that the start address "staddr (i)" and the end address "endaddr (i)" in the "i" rule group having a common consequent are respectively set to buffer registers 27 and 28.

The buffer register 27 has a counter function, and its output is applied to the fuzzy rule storage 9 (FIGS. 3 and 6) to access the corresponding rule in the storage as an access signal "ruladdr" for executing a reasoning. If the reasoning by one rule in the rule group is finished, a count-up signal is generated from a synchronising circuit 29 to advance the counter buffer register 27 for generating an output "ruladdr" whereby a reasoning by the subsequent rule is initiated. Thus, if all rules in the rule group are entirely executed, a comparator 30 for comparing the output from the counter buffer register 27 with the output from an end address buffer 28 produces an output to stop the counter buffer register whereby the reasoning by all rules in the rule group having the common consequent is finished.

How the thus repeated reasoning is performed will be described hereinafter.

Figure 10:
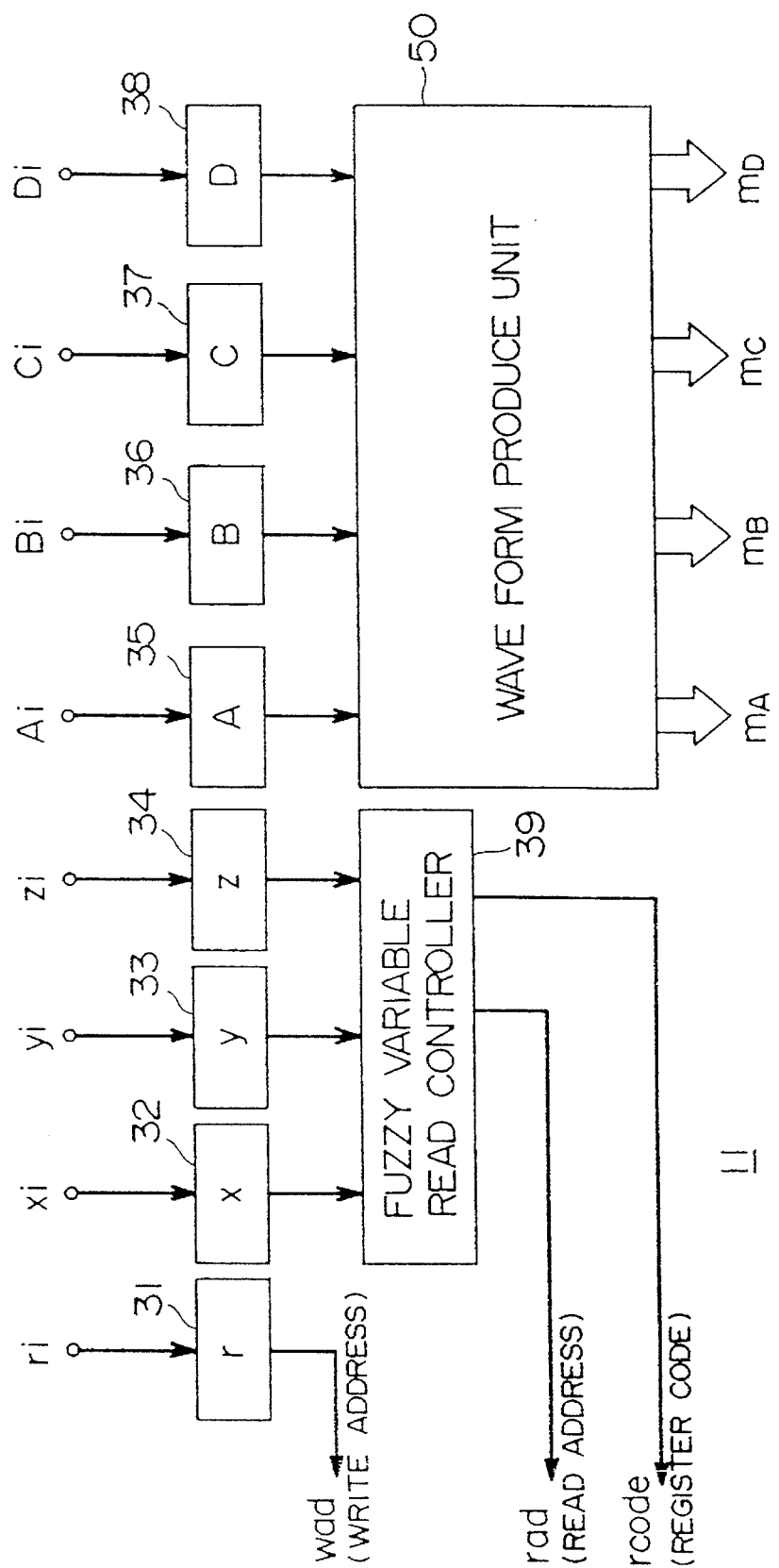
FIG. 10 is a schematic block diagram of a fuzzy rule register employed in the computer of FIG. 3.

The above-mentioned rule address signal "ruladdr" is applied to the fuzzy rule storage 9 (FIG. 3), and its corresponding rule is read by the fuzzy rule register 11, the construction of which is shown in FIG. 10.

Let it be assumed that the rule read out by the rule address signal "ruladdr" is expressed by the following equation (1), $$\text{if } x=A \cdot y=B \cdot z=C \text{ then } r=D \tag{1}$$

where x, y, z and r are fuzzy variables and have address signal forms as described later.

The rule represented by the equation (1) which is read from the fuzzy rule storage 9 is latched and stored by latch circuits 31 through 38 (FIG. 10) for each variable.

Figure 11:
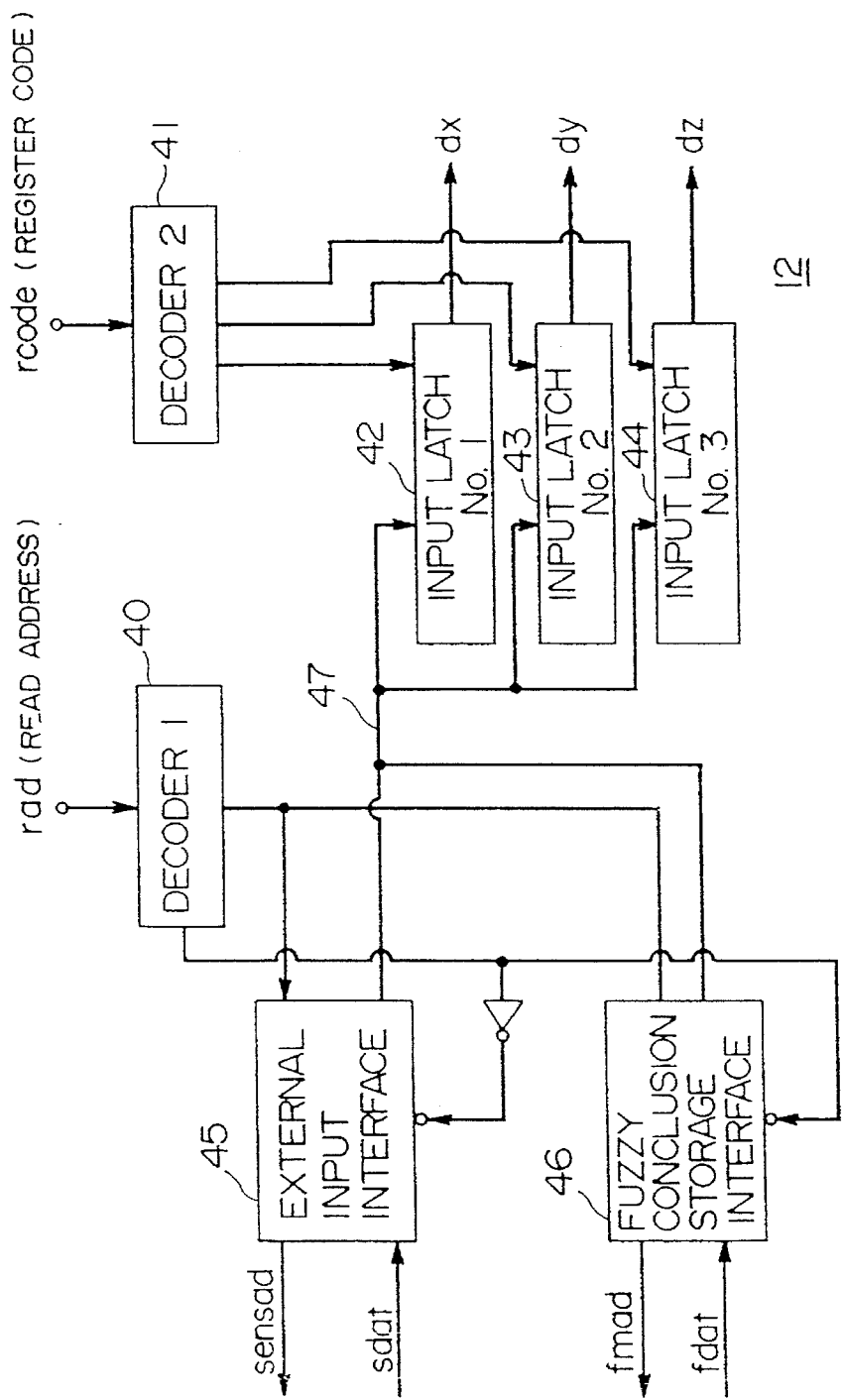
FIG. 11 is a block diagram of an input controller employed in the computer of FIG. 3.
Figure 12:
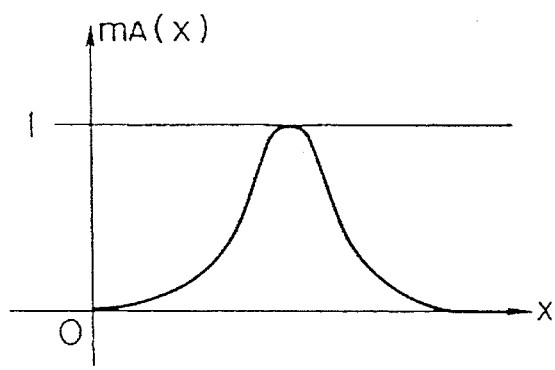
FIG. 12 is a graph illustrating a membership function employed in a wave form produce unit in the register of FIG. 10.

The address in the "r" latch circuit 31 is used through a write interface 22 (FIG. 8) as a write address signal "wad" for the fuzzy conclusion storage 20. The addresses in the "x", "y" and "z" latch circuits 32, 33 and 34 are converted into a time sequence by a fuzzy variable read controller 39 to be subsequently applied to an input controller 12 (FIG. 3) as a read address "rad" together with a register code "rcode". A construction of the input controller 12 is shown in FIG. 11.

The signals thus fed to the input controller 12 regarding the antecedent of the rule are decoded by a pair of decoders 40 and 41. If the read address "rad" and the register code "rcode" regarding the first fuzzy variable are applied to the controller 12, the register code "rcode" is decoded by the decoder 41 and an input latch 44 is selected. The read address "rad" is decoded by the decoder 40 which inquires whether data should be gained from its inner part, viz., the fuzzy conclusion storage 20 (FIG. 8) or from its external part, viz., a sensor or a lower rank FC. In accordance with the result of the inquiry, an external input interface 45 or a fuzzy conclusion storage interface 46 is selected to generate an address signal regarding the fuzzy variable x.

That is, the selection of the interface 45 or 46 is made by the status that a predetermined bit in the read address "tad" is "1" or "0". If the conclusion storage interface 46 is selected, an address signal "fmad" regarding the fuzzy variable x is produced from the interface 46, and the fuzzy conclusion storage 20 (FIG. 8) through an input controller interface 225 to read the data from the storage 20. The read data is applied to the fuzzy conclusion storage interface 46 (FIG. 11) as a signal "fdat" through the input controller interface 225.

On the other hand, if the external input interface 45 is selected, the interface 45 produces a select signal "sensad" for sensor 6 or lower rank FC. The selected sensor or FC sends back to the interface 45 a status signal or a fuzzy reasoned result as a signal "sdat".

The data entered into the fuzzy conclusion storage interface 46 and sent to the external input interface 45 are set through a line 47 into an input latch 42 as a signal "dx". The same operations are made regarding the variables y and z, and fuzzy variable values dy and dz are set into the input latches 43 and 44.

These fuzzy variable values dx, dy and dz execute a reasoning together with another signal, viz., a membership function. A construction for generating the membership funcron will be set out below.

Returning to FIG. 10, labels A, B, C and D of membership functions of fuzzy rules are latched for storage in the latch circuits 35, 36, 37 and 38 as set forth above. Thus latched labels A, B, C and D are applied to a waveform produce unit 50 as a part of an address thereto, and the unit 50 generates signals representing functions in a time dependent type as described below.

As set out above, the waveform produce unit 50 generates fuzzy membership functions. Generally, the fuzzy membership function is represented by a continuance function having at its abscissa a fuzzy variable and at its ordinate a belongings degree. Meanwhile, the fuzzy computer in this embodiment generates a membership function shown in FIG. 13 wherein the fuzzy variable x is provided in a dispersed fashion and the respective belongings degrees are represented by pulse lengths having the simultaneous terminal points (viz., pulse widths), which is called as the PWM (Pulse Width Modulation) expression of the membership function. These pulses have the simultaneous terminal points, but, if desired, may have the simultaneous starting points.

Figure 14:
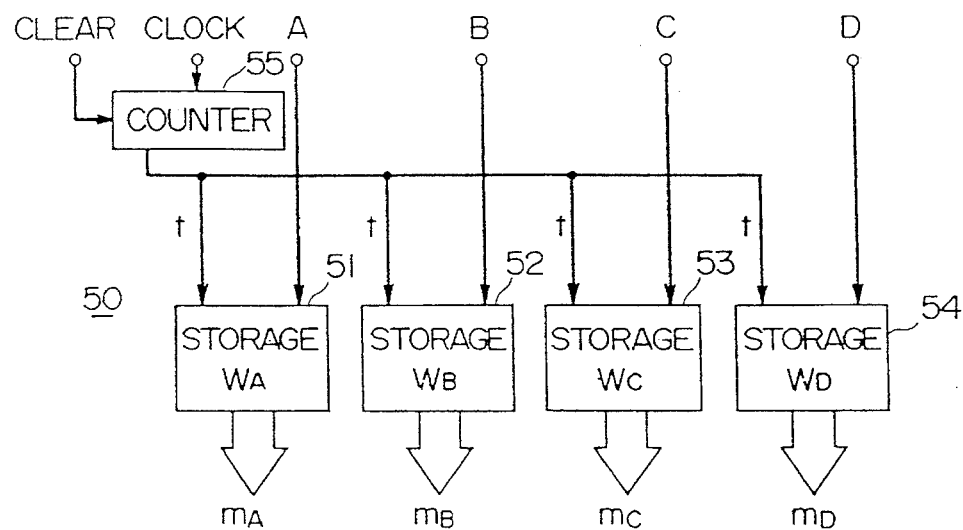
FIG. 14 is a block diagram of the wave form producing unit in the register of FIG. 10.

FIG. 14 shows a detailed constructin of the waveform produce unit 50 which stores function forms of a pluratity of kinds of membership functions.

Waveform storage 51, 52, 53 and 54 store functions to be selected corresponding to the labels (A, B, C, D . . . ) playing input signals, and a counter 55 controles a reading timing for the selected function.

Figure 13:
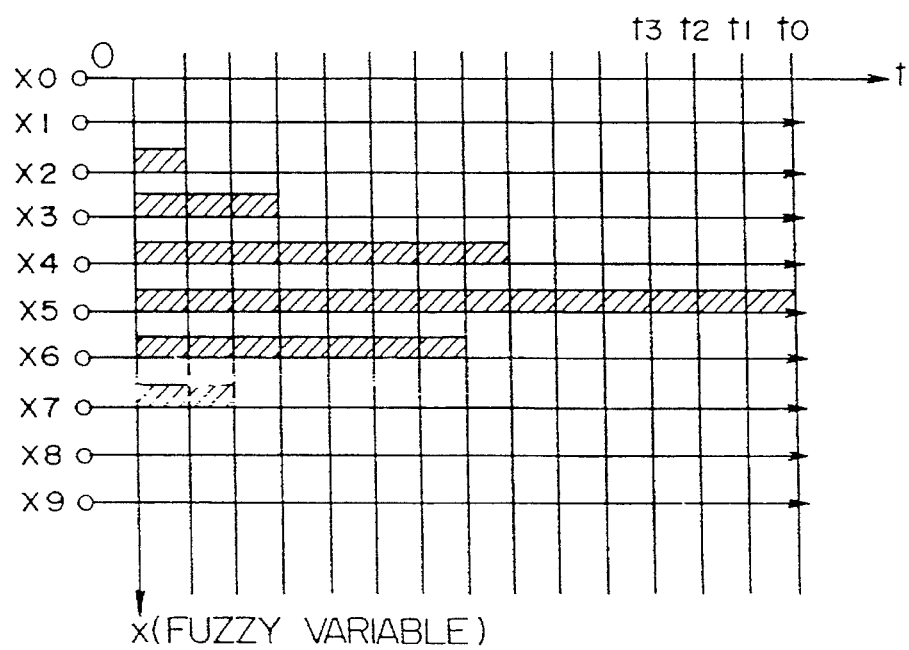
FIG. 13 is a graph illustrating the membership function decomposed for each line.
Figure 15:
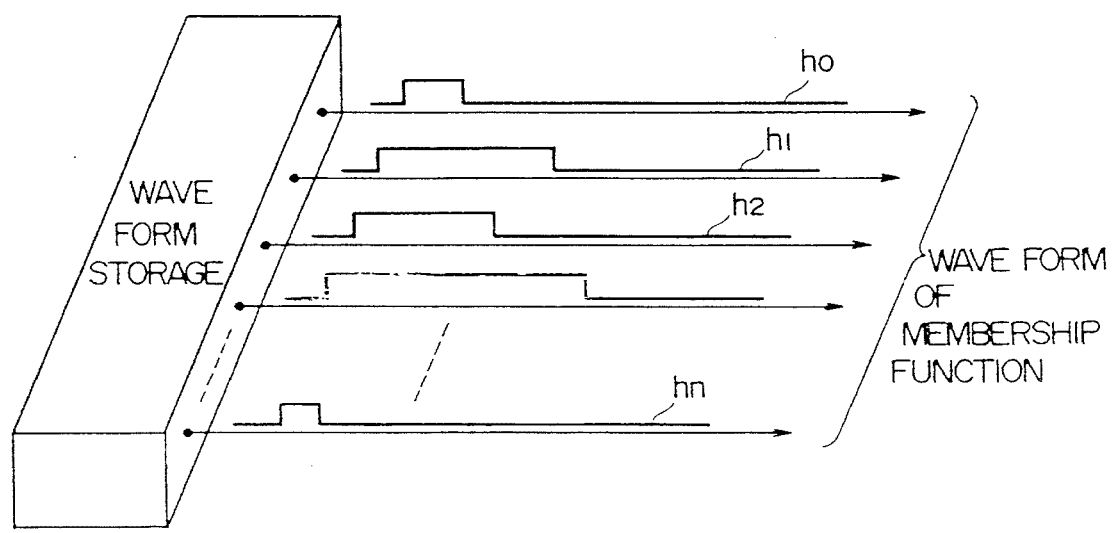
FIG. 15 shows waveforms of a membership function produced from a wave form production unit of FIG. 14.

Referring to FIGS. 13 and 14, the waveform storages 51 through 54 store a plurality of membership functions represented by the PWM expression having at its lattice "0" or "1" as shown in FIG. 13 in the order of labels. Accordingly, if a membership function is designated by a label and a count value is applied by the counter 55 counting clock pulses, the waveform storages 51 to 54 are accessed in the order of time, t0, t1, t2, t3 . . . , as shown in FIG. 13, and a membership functon represented by pulse lengths is generated on lines h0, h1, h2 . . . hn as shown in FIG. 15.

Figure 16:
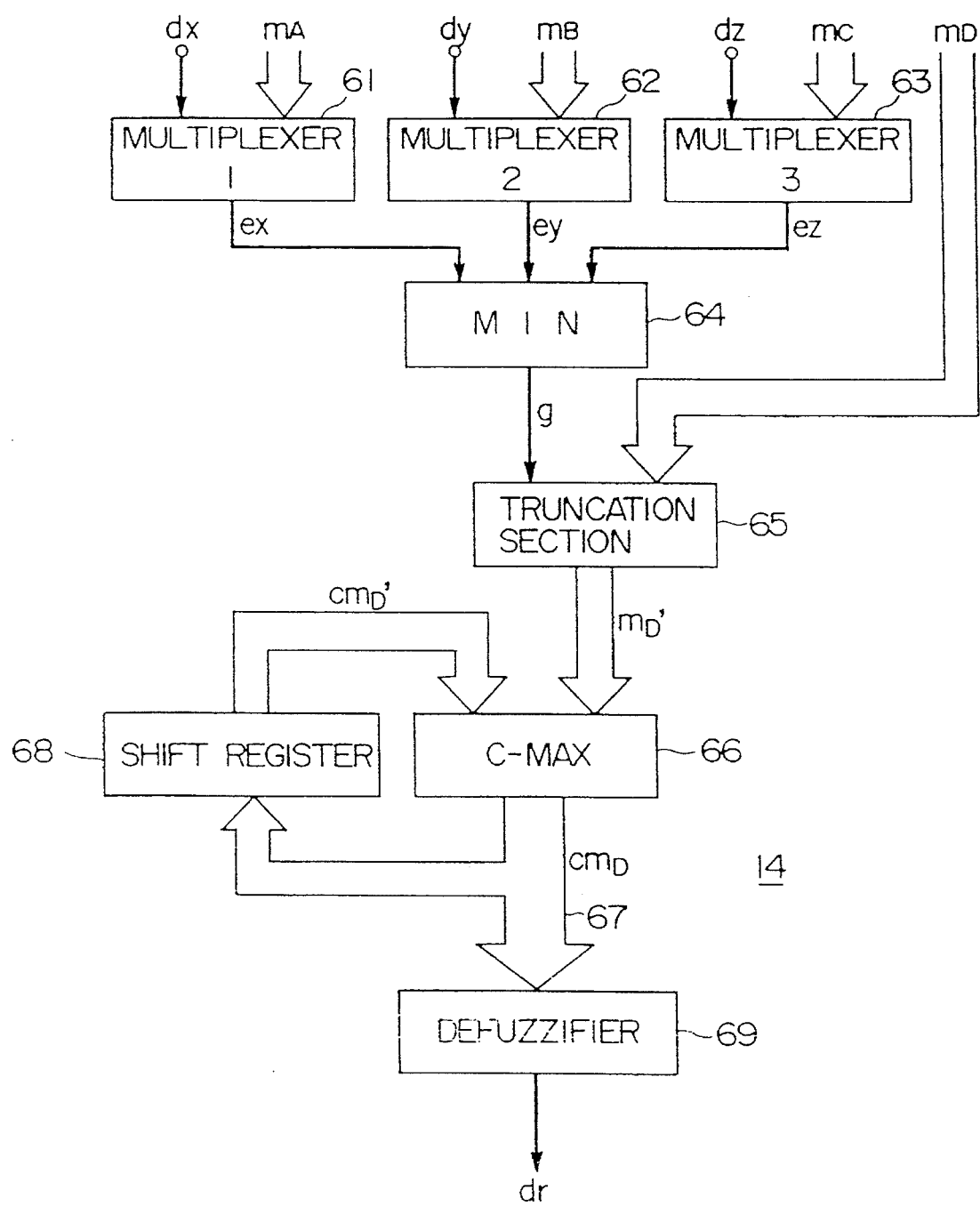
FIG. 16 is a block diagram of a fuzzy reasoning unit in the computer of FIG. 3.

Thus, a fuzzy reasoning is executed by the fuzzy variable values dx, dy and dz and the membership functions (mA, mB, mC and mD). Referring to FIG. 16, there is shown a schematic construction of the fuzzy reasoning unit 14 of FIG. 3.

The fuzzy reasoning unit 14 processes an antecedent of a fuzzy rule. That is, input membership functions mA, mB and mC represented by PWM on a plurality of lines h0, h1, h2 . . . hn (see FIG. 15) are connected to multiplexers 61, 62 and 63 which select one of the lines h0, h1, h2 . . . hn in accordance with the magnitudes of the fuzzy variables dx, dy and dz to generate belongings degrees ex, ey and ez. This is equivalent to the operation that a conventional fuzzy computer evaluates an input signal from sensors or the like in a membership function to generate a belongings degree. The conventional fuzzy computer expresses the belongings degree by the potential or current magnitudes of electronic signals, but the computer in this embodiment expresses it by pulse widths.

Figure 17:
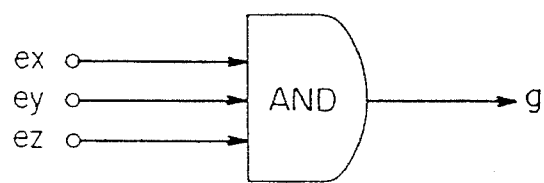
FIG. 17 is a circuit diagram of a MIN circuit employed in the unit of FIG. 16.

In FIG. 16, the belongings degrees or values ex, ey and ez are operated by a minimum circuit 64 about a MIN operation. The minimum curcuit 64 is constructed by a simple AND circuit shown in FIG. 17. Since the belongings values ex, ey and ez are represented by PWM, the AND circuit can easily select the pulse having the narrowest pulse width (belongings value) in the MIN operation to produce an output g.

Upon completion of the operation about the antecedent, the operation moves to the consequent which is processed by a truncation section 65.

Figure 18:
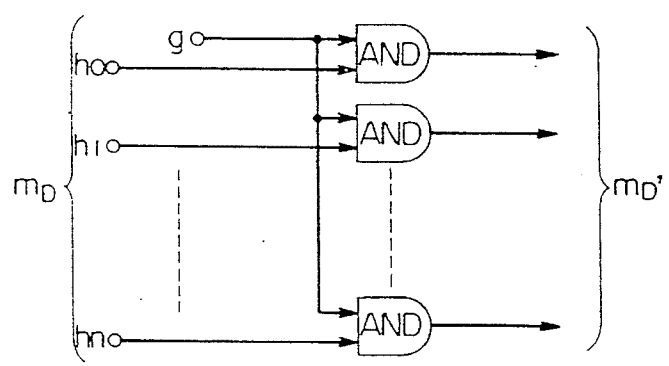
FIG. 18 is a block diagram of a truncation section employed in the unit of FIG. 16.

The truncation section 65 is constituted with an AND circuit group connected in a parallel relationship shown in FIG. 18, in which one input terminals of the respective AND circuits are commonly connected with the output terminal of the minimum circuit 64 to be fed with the output g representing the shortest pulse width signal.

Other inputs of the truncation section 65 are the membership function mD at the consequent, which is represented by the pulse widths on the prularity of lines h0, h1, h2 . . . hn. Upon application of such pulse signals (g and mD), the truncation section 65 selects the narrower Width of pulse in the pulse signals to generate an output mD' which is represented by "n" lines corresponding to the input mD. This is similar to the so-called truncating operation in the conventional fuzzy computer.

Upon completion of the operations at the antecedent and the consequent, one operation is finished, so that the fuzzy computer advances to the subsequent rule. Thus, the subsequent rules are executed to complete the final reasoning. The composition of the executed results by the respective rules will be described hereinafter.

As mentioned above, upon completion of the execution by the first rule, the result mD' of the execution is read by a shift register group 68 reset in its initial status through a C-maximum circuit 66 and a bus 67 consisting of n lines. The shift register group 68 is constituted with n sets of shift registers, which reappearably stores pulse width signals represented by the above-mentioned PWM type.

Figure 19:
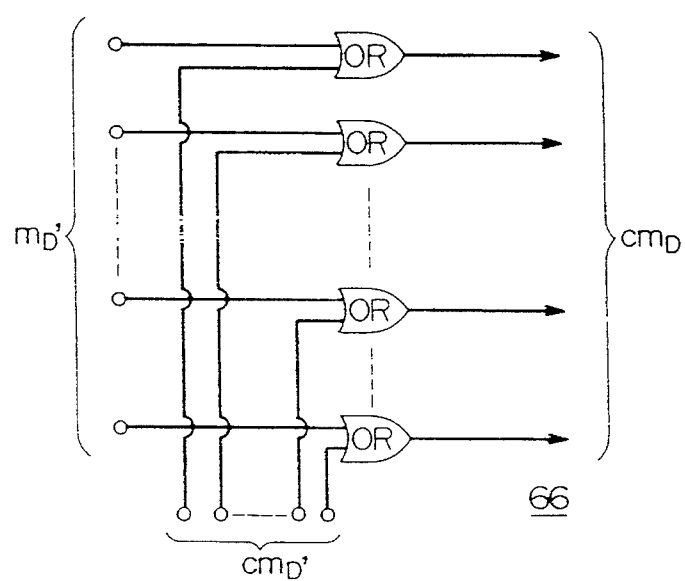
FIG. 19 is a diagram of a correspondence maximum (C-MAX) circuit employed in the unit of FIG. 16.

As shown in FIG. 19, the C-maximum circuit 66 includes n sets of two-input OR circuits in parallel corresponding to the above-mentioned number of lines. Accordingly, the respective pulse signals of the output mD' are stored into the shift register group 68 as they are after the execution by the first rule.

Upon completion of the execution by the second rule, the output mD' is synchronized with the timing applied to the C-maximum circuit 66 and applied by the reappeared execution result by the first rule from the shift region group 68, and the signal having the longer pulse width is selected for "n" lines and stored into the shift register group 68 as set out above. This is equal to the operation of the so-called MAX operation by the conventional fuzzy computer.

Thus, for each completion of the execution by every rule, a synthetic result by the rules executed that time is stored in the shift register group 68 by the PWM expression.

A defuzzify operation in which thus gained reasoning result is converted into affirmed value information will be described hereinafter.

Figure 20:
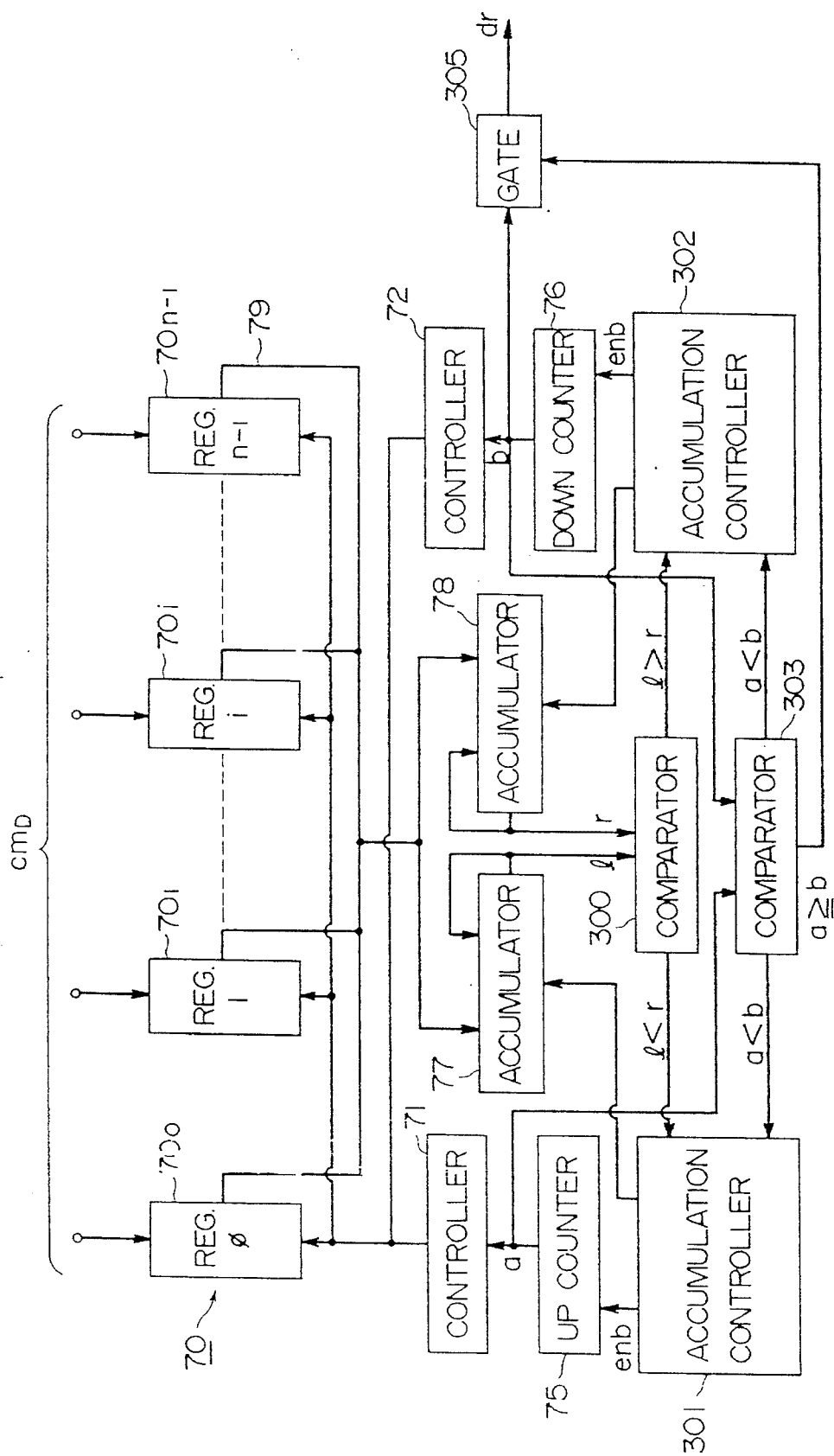
FIG. 20 is a block diagram of a defuzzifier employed in the unit of FIG. 16.
Figure 21:
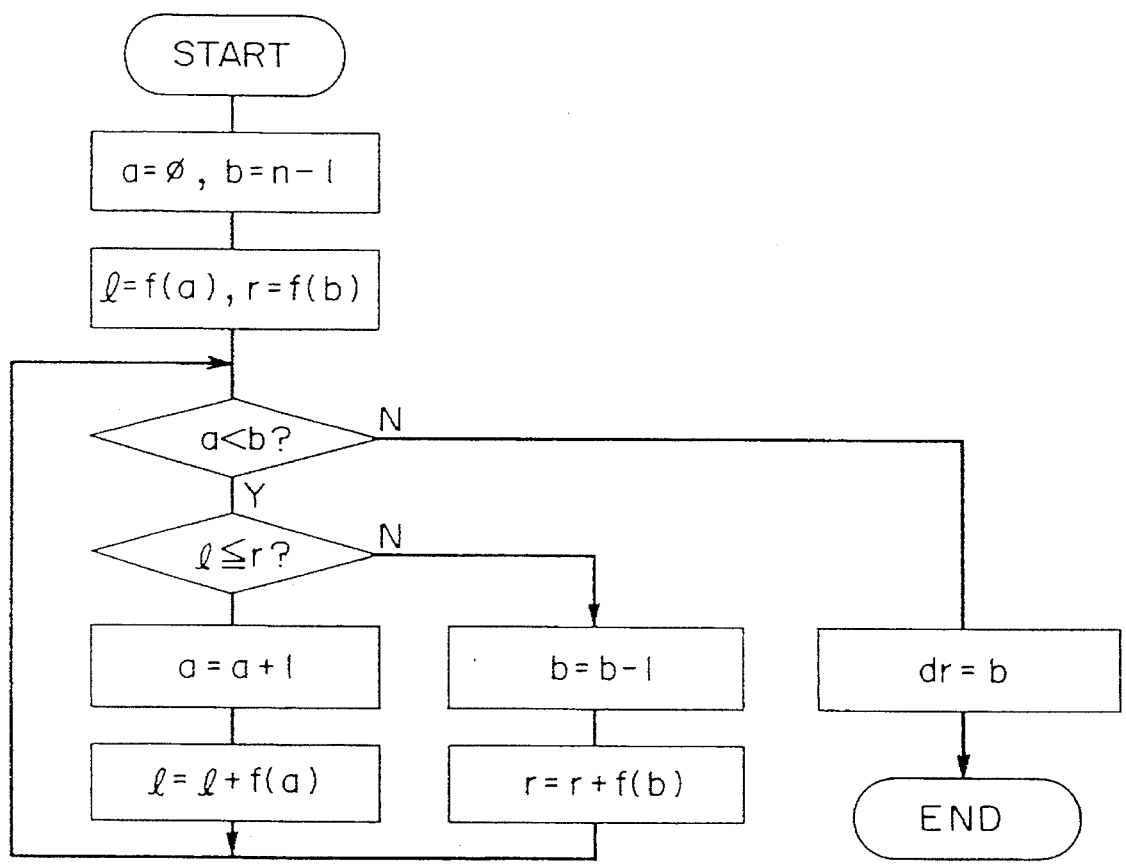
FIG. 21 is a flow chart illustrating an operation by the defuzzifier of FIG. 20.

FIG. 20 shows a construction of a defuzzifier 69 to carry out the defuzzify operation, and FIG. 21 shows a flow chart in the defuzzifier 69.

Upon completion of the execution by all rules, the execution result stored in the shift register group 68 (FIG. 16) is read through a bus 67 into n pieces of shift registers $70_0$ through $70_{n-1}$ for each line. As a result, in each shift register 70 the execution result expressed by PWM is stored in a transcribed manner. The storage status is illustratively shown in FIG. 22.

These shift registers 70 read data in a serial mode as described above, but generate an output as a parallel signal. This parallel signal provides the above-described PWM mode execution result, for example, the height of wave form 73 in FIG. 22.

Figure 22:
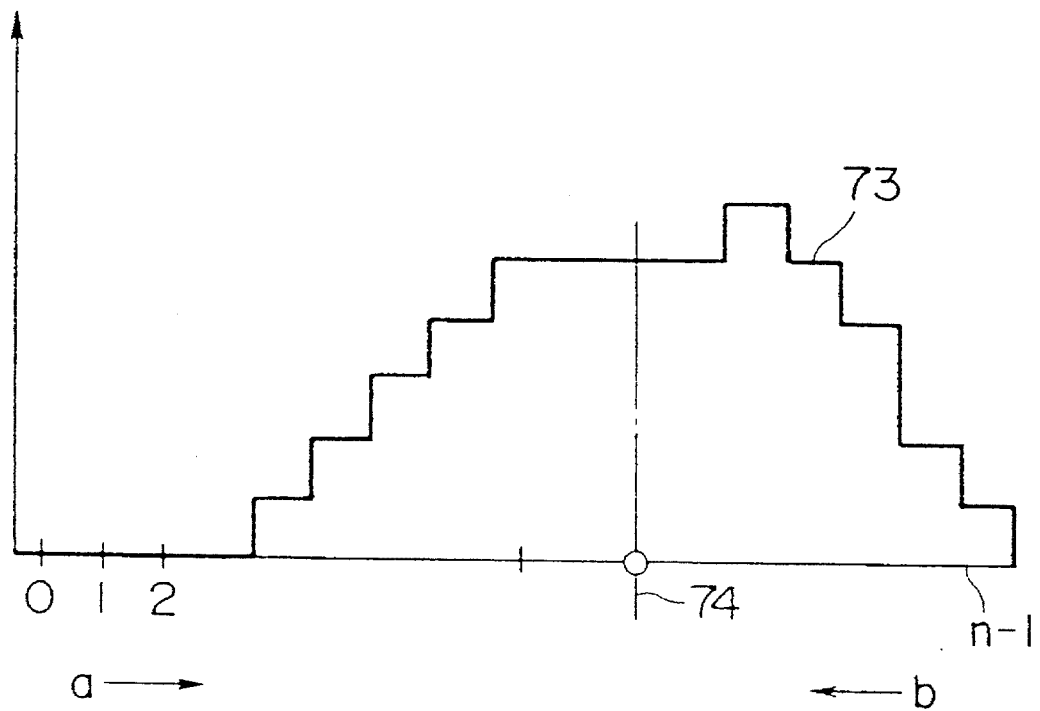
FIG. 22 is a graph illustrating a reasoning result.

The defuzzify operation in this fuzzy computer is executed by defining as an affirmed value the point which equally divides the area of the above-mentioned waveform 73 of FIG. 22, right and left. This defuzzify operation will be briefly described hereinafter. In FIG. 22, a left-hand partial area of the waveform is successively calculated by adding (accumulating) the wave height of the waveform in the direction from the left hand to the direction a, while a right-hand partial area of the waveform is also similarly calculated from the right hand to the direction b. The respective partial areas are compared to detect their coincedence. If there is no coincidence, the smaller area side is calculated by the above addition and the result of this addition is reviewed as to the above comparison. By repeating thus addition (accumulation) and comparison, the defuzzified output 74 is eventually gained.

In an initial operation, left and right counters 75 and 76 are preset to "0" and "n–1", respectively, so that the left-end shift register $70_0$ and the right-end shift register $70_{n-1}$ are designated (addressed). Then accumulators 77 and 78 are reset. As a result, through a lead controller 71 the left-end shift register $70_0$ is addressed and the data f (0) is produced on data bus 79. This produced data is added to the contents in the accumulator 77, and the addition result is stored in the accumulator 77.

Next, through a lead controller 72 the right-end shift register $70_{n-1}$ is addressed, and the data f (n–1) is produced on the data bus 79. The produced data is added to the contents in the accumulator 78, and the addition result is stored in the accumulator 78. Then, a comparator 300 compares the value "1" of the accumulator 77 with the value "r" of the accumulator 78, so that it drives an accumulation controller 301 if $1 \leq r$ and an accumulation controller 302 if $1 > r$. Upon driving the controller 301 or 302, an up-counter 75 or a down-counter 76 is fed with an enable signal.

Upon receiving the enable signal the up counter 75 adds "1" to a stored value "a" to drive the lead controller 71 which designates the shift register corresponding to the value "a" of the up-counter 75. The data of the designated shift register is added into the accumulator 77.

Upon receiving the enable signal, the down counter 76 subtracts "1" from the stored value "b" to drive the lead controller 72 which designates the shift register corresponding to the value "b" of the down counter 76. The data in the designated shift register is added into the accumulator 78.

Subsequently, either the group of accumulator controller 301, counter 75, lead controller 71, and accumulator 77 or the group of accumulation controller 302, counter 76, lead controller 72 and accumulator 78 is selected by the comparator 300 to be driven.

On repeating the above-described operation, the comparator 303 receiving the outputs from the counters 75 and 76 detects the value of counter 75 exceeding the value of counter 76 to open a gate 305. Upon opening the gate 305, the data stored in the counter 76 is produced as an affirmed value "dr". When the gate 305 is opened, the accumulated value in the accumulator 77 is nearly equal to that in the accumulator 78 within the range of clearance.

The affirmed value, viz., the conclusion value dr is stored into the fuzzy conclusion storage 20 (FIG. 8) through the write interface 224 wherein the address stored in the r latch circuit 31 given by the MPU1 is used.

Figure 23A:
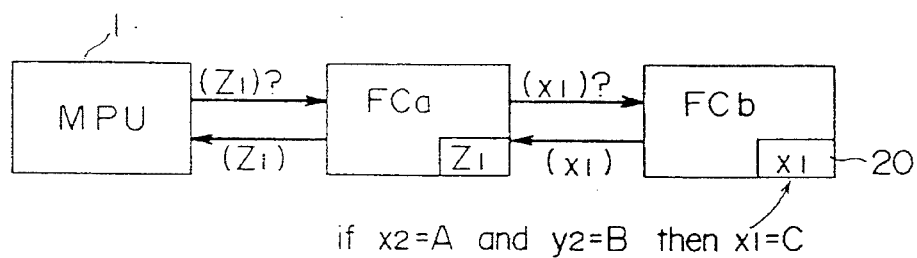
FIGS. 23(a) and 23(b) illustrate a case in which the same reasoning as a past reasoning is implemented.
Figure 23B:
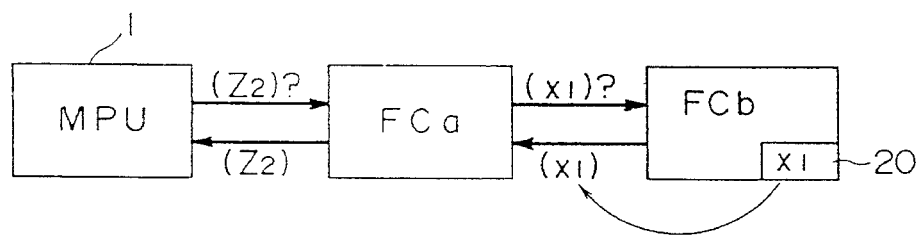
Figure 24A:
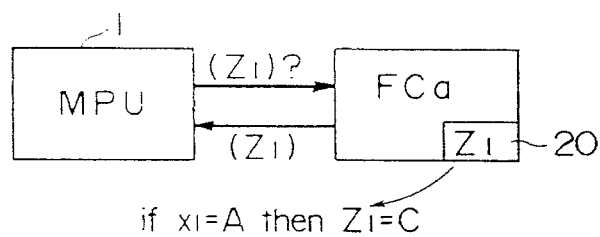
FIGS. 24(a) and 24(b) illustrate a case in which a past result is used at the antecedent.
Figure 24B:
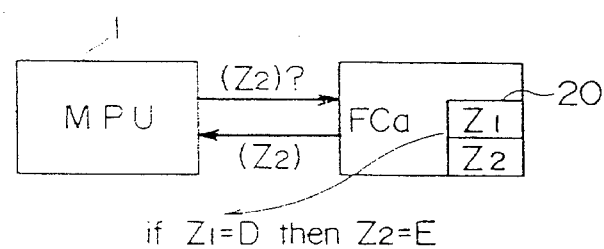

The affirmed or decided value stored in the fuzzy conclusion storage 20 is read out from the same fuzzy conclusion storage 20 through the conclusion storage data register 25 for application to the conclusion data register 251 for subsequent use when the request for a same defuzzified output is subsequently made (FIG. 23). In FIG. 23(*a*), a fuzzy variable $X_1$ having a decided value C is stored in the storage 20. In FIG. 23(*b*), the stored value in the past reasoning is read from the storage 20. If a value stored in the fuzzy conclusion storage 20 appears on the antecedent in the subsequent reasoning as a variable, the value is used for executing the reasoning at the antecedent (FIGS. 24). In FIG. 24(*a*), a fuzzy variable $Z_1$ having a value C is stored in the storage 20. In FIG. 23(*b*), if the stored value of the variable $Z_1$ is found at an antecedent in a later reasoning, it is used in the later reasoning.

What is claimed is:

1. In a fuzzy reasoning system having first storage means for storing input data which can be used in fuzzy inference processing, second storage means for storing membership functions which can be used in fuzzy inference processing, a rule storage means (9) for storing a plurality of fuzzy rules, and a fuzzy reasoning means for performing fuzzy inference processing using the input data stored in said first storage means and the membership functions stored in said second storage means in accordance with the fuzzy rules stored in said rule storage means and outputting a result of the fuzzy reasoning processing, a method of controlling said fuzzy reasoning system comprising the steps of:

selecting one of said stored plurality of fuzzy rules and reading a selectable fuzzy rule from said rule storage means;

forming rule data corresponding to an input variable and rule data corresponding to a membership function from said read fuzzy rule;

converting said rule data corresponding to the input variable into a first address for accessing said input data stored in said first storage means;

converting said rule data corresponding to the membership function into a second address for accessing said membership function stored in said second storage means;

accessing said input data stored in said first storage means in accordance with said first address and accessing said membership function stored in said second storage means in accordance with said second address; and feeding data obtained by said accessing step to said fuzzy reasoning means.

2. A method as defined in claim 1, further comprising a step of storing data obtained by an external device in said first storage means as said input data.

3. A method as defined in claim 1, further comprising a step of storing a result of a fuzzy reasoning processing in said first storage means as said input data.

4. A method as defined in claim 1, wherein said first address is for accessing also an external device.

5. A method as defined in claim 1, further comprising a step of causing said fuzzy reasoning means to operate a defuzzified output.

6. In a fuzzy reasoning system having membership function storage means for storing membership functions which can be used in fuzzy inference processing, a rule storage means (9) for storing a plurality of fuzzy rules, and a fuzzy reasoning means for performing fuzzy inference processing using the membership functions stored in said membership function storage means in accordance with the fuzzy rules stored in said rule storage means and outputting a result of the fuzzy reasoning processing, a method of controlling said fuzzy reasoning system comprising the steps of:

selecting one of said stored plurality of fuzzy rules and for reading a selectable fuzzy rule from said rule storage means;

forming rule data corresponding to an input variable and rule data corresponding to a membership function from said read fuzzy rule;

converting said rule data corresponding to the input variable into a first address for accessing an external device;

converting said rule data corresponding to the membership function into a second address for accessing said membership function stored in said membership function storage means;

accessing input data fed by said external device in accordance with said first address and accessing said membership function stored in said membership function storage means in accordance with said second address; and feeding data obtained by said accessing step to said fuzzy reasoning means.

7. A method as defined in claim 6, wherein said first address is for accessing also data storage means storing input data which can be used in fuzzy inference processing.

8. A fuzzy reasoning method, comprising:

reading a fuzzy rule from a rule storage which stores a plurality of fuzzy rules;

forming rule data corresponding to an input variable and rule data corresponding to a membership function from said read fuzzy rule;

converting said rule data corresponding to the input variable into a first address for accessing input data stored in an input data storage;

converting said rule data corresponding to the membership function into a second address for accessing a membership function stored in a membership function storage;

accessing said input data stored in said input data storage in accordance with said first address and accessing said membership function stored in said membership function storage in accordance with said second address; and performing fuzzy inference processing using data obtained by the accessing step and outputting a defuzzified output determined by the fuzzy inference processing.

9. A method as defined in claim 8, wherein said first address is for accessing also an external device.

10. A fuzzy reasoning method, comprising:

reading a fuzzy rule from a rule storage which stores a plurality of fuzzy rules;

forming rule data corresponding to an input variable and rule data corresponding to a membership function from said read fuzzy rule;

converting said rule data corresponding to the input variable into a first address for accessing an external device;

converting said rule data corresponding to the membership function into a second address for accessing a membership function stored in a membership function storage;

accessing input data fed by said external device in accordance with said first address and accessing said membership function stored in said membership function storage in accordance with said second address; and performing fuzzy inference processing using data accessed by the accessing step and outputting a defuzzified output determined by the fuzzy inference processing.

11. A method as defined in claim 10, wherein said first address is for accessing also data storage storing input data which can be used in fuzzy inference processing.

* * * * *

UNITED STATES PATENT AND TRADEMARK OFFICE
CERTIFICATE OF CORRECTION

PATENT NO. : 5,479,568  
APPLICATION NO. : 08/300486  
DATED : December 26, 1995  
INVENTOR(S) : Atsushi Hisano It is certified that error appears in the above-identified patent and that said Letters Patent is hereby corrected as shown below:

TITLE PAGE & COL. 1, LINE 1,

Please change the Title of the invention from "Reasoning computer system" to --Fuzzy Reasoning Computer--.

Signed and Sealed this

Third Day of June, 2008

JON W. DUDAS  
*Director of the United States Patent and Trademark Office*